(12) United States Patent
Dolatsha et al.

(10) Patent No.: US 11,101,828 B2
(45) Date of Patent: Aug. 24, 2021

(54) SCALABLE MM-WAVE ARRAYS WITH LARGE APERTURE REALIZED BY MM-WAVE DIELECTRIC WAVEGUIDES

(71) Applicant: The Board of Trustees of the Leland Stanford Junior University, Redwood City, CA (US)

(72) Inventors: Nemat Dolatsha, Sunnyvale, CA (US); Mohammad Amin Arbabian, Stanford, CA (US); Babak Mamandipoor, San Jose, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 16/604,808

(22) PCT Filed: Apr. 20, 2018

(86) PCT No.: PCT/US2018/028612
§ 371 (c)(1),
(2) Date: Oct. 11, 2019

(87) PCT Pub. No.: WO2018/195453
PCT Pub. Date: Oct. 25, 2018

(65) Prior Publication Data
US 2021/0135691 A1    May 6, 2021

Related U.S. Application Data

(60) Provisional application No. 62/487,842, filed on Apr. 20, 2017.

(51) Int. Cl.
*H04B 1/00* (2006.01)
*H04B 7/06* (2006.01)
(Continued)

(52) U.S. Cl.
CPC .............. *H04B 1/0067* (2013.01); *H01P 3/16* (2013.01); *H01Q 21/24* (2013.01); *H04B 7/0413* (2013.01); *H04B 7/0617* (2013.01)

(58) Field of Classification Search
CPC .. H04B 1/0067; H04B 7/0413; H04B 7/0617; H01P 3/16; H01Q 21/24
See application file for complete search history.

(56) References Cited

U.S. PATENT DOCUMENTS 4,768,852 A * 9/1988 Ih ..................... G02B 6/12004
359/287
6,208,313 B1   3/2001 Frank et al.
(Continued)

OTHER PUBLICATIONS

Milligan. "Modern Antenna Design," ISBN-13 978-0-471-45776-3, 2005, pp. 1-99, [retrieved on Jun. 15, 2018]. Retrieved from the Internet: <URL: http://www.radio-astronomy.org/library/Antenna-design.pdf> entire document.

*Primary Examiner* — Dominic E Rego
(74) *Attorney, Agent, or Firm* — Mintz Levin Cohn Ferris Glovsky and Popeo, P.C.

(57) ABSTRACT

Direct signal distribution at mm-wave frequencies is provided by using dielectric waveguides for passive coherent distribution. The relevant distribution path lengths at mm-wave frequencies are short enough that accumulated phase error is not a significant problem. Meanwhile, the dielectric waveguides provide low loss and substantial immunity to electrical interference, thereby avoiding the main disadvantages of direct signal distribution in RF systems.

15 Claims, 9 Drawing Sheets

(51) Int. Cl.
  *H04B 7/0413* (2017.01)
  *H01Q 21/24* (2006.01)
  *H01P 3/16* (2006.01)

(56) References Cited

U.S. PATENT DOCUMENTS

| | | | |
|---|---|---|---|
| 6,777,684 B1 | 8/2004 | Volkov et al. | |
| 7,202,824 B1 * | 4/2007 | Sanelli | H01Q 1/523 343/702 |
| 8,515,493 B1 * | 8/2013 | Jensen | H01Q 25/00 455/562.1 |
| 9,190,723 B1 * | 11/2015 | Hong | H01Q 17/00 |
| 2003/0072131 A1 * | 4/2003 | Hood | G06F 1/1616 361/679.09 |
| 2009/0022138 A1 * | 1/2009 | Gilchrist | H04B 7/022 370/350 |
| 2009/0040114 A1 * | 2/2009 | Okamura | H01Q 1/2266 343/700 MS |
| 2009/0251380 A1 * | 10/2009 | Kuramoto | H01Q 7/02 343/843 |
| 2010/0054227 A1 | 3/2010 | Hettstedt et al. | |
| 2010/0081400 A1 * | 4/2010 | Takahara | H04B 1/0458 455/127.1 |
| 2010/0111537 A1 | 5/2010 | Cheng et al. | |
| 2014/0092759 A1 * | 4/2014 | Pisharody | H04W 64/00 370/252 |
| 2014/0132450 A1 | 5/2014 | Chen et al. | |
| 2015/0195001 A1 * | 7/2015 | Barker | H04B 7/0617 342/367 |
| 2015/0295307 A1 | 10/2015 | Cook et al. | |
| 2016/0240907 A1 | 8/2016 | Haroun | |
| 2016/0248515 A1 * | 8/2016 | Zheng | H04J 14/06 |
| 2017/0018852 A1 | 1/2017 | Adriazola et al. | |
| 2017/0069958 A1 * | 3/2017 | Ko | H01Q 1/243 |
| 2017/0085293 A1 * | 3/2017 | Marrow | G01S 3/48 |
| 2017/0264012 A1 * | 9/2017 | Clark | H01Q 1/523 |
| 2018/0026379 A1 * | 1/2018 | Barker | H01Q 21/065 343/844 |
| 2018/0084386 A1 * | 3/2018 | Shpak | H04L 69/22 |
| 2018/0151939 A1 * | 5/2018 | Hashimoto | H01Q 1/1278 |
| 2020/0350698 A1 * | 11/2020 | Rofougaran | H01Q 1/523 |

\* cited by examiner

SCALABLE MM-WAVE ARRAYS WITH LARGE APERTURE REALIZED BY MM-WAVE DIELECTRIC WAVEGUIDES

CROSS-REFERENCE TO RELATED APPLICATION

This application is a national phase entry of Patent Cooperation Treaty Application PCT/US2018/028612 filed Apr. 20, 2018, entitled "SCALABLE MM-WAVE ARRAYS WITH LARGE APERTURE REALIZED BY MM-WAVE DIELECTRIC WAVEGUIDES," which claims priority to U.S. Provisional Application No. 62/487,842 filed on Apr. 20, 2017, entitled "SCALABLE MM-WAVE ARRAYS WITH LARGE APERTURE REALIZED BY MM-WAVE DIELECTRIC WAVEGUIDES," the disclosure of these are incorporated herein by reference in their entirety.

FIELD OF THE INVENTION

This invention relates to coherent mm-wave systems.

BACKGROUND

For various applications, it is desirable to be able to emit or receive electromagnetic radiation from widely spaced radiative elements (i.e., element spacing of 30λ or more) such that phase coherence is preserved. Assuming an architecture where radiative elements are connected to a central processor via a distribution network, phase coherence means that the distribution network preserves phase—i.e., for any input and output of the distribution network, there is a substantially fixed relation between the corresponding input and output phases.

Conventional implementations of this concept have been considered for both optical and RF frequencies, with non-trivial differences in the corresponding system architectures being driven by practical considerations relating to the differing frequency ranges.

For RF systems, a common approach is to distribute signals from the central processor at a relatively low frequency (often called 'baseband') which is then shifted in frequency to a substantially higher frequency (often called 'RF') in frequency-translating front ends disposed at the radiative elements. Frequency translating front ends typically perform an analog multiplication function with two inputs. For transmission, the inputs are the distributed baseband from the central processor and a high intermediate frequency (IF) provided by a local oscillator at the front end, and the output is a RF signal to be radiated. For reception, the inputs are the IF from the local oscillator and a received high frequency RF signal and the output is baseband to be received at the central processor. The same component (analog mixer) can usually provide both of these functions. The main reason for this approach is that direct distribution at RF frequencies on conventional electrical transmission lines or RF metal waveguides etc. would encounter severe problems with attenuation (e.g., as seen on FIG. 8) and electrical interference, because both loss and electrical interference increase rapidly with frequency in such structures.

The situation with optical systems provides an interesting contrast. Here loss and optical interference are negligible over such distances in optical fibers. However, it is impossible for a simple passive network of optical fibers to provide phase coherence as indicated above. The reason is that environmental perturbations to optical fibers (or more generally to any optical waveguide) such as mechanical vibrations, temperature variations, bending or stress applied to the fiber etc. all act to cause small changes to the optical wavelength in the fiber corresponding to the operating frequency. These small changes in wavelength lead to random phase shifts. Although these random phase shifts are very small over a path length on the order of a wavelength, typical optical path lengths in macroscopic systems are millions of optical wavelengths long. As a result the output phase of any typical macroscopic length of optical fiber has no substantially fixed relation to the input phase of that optical fiber because of the accumulation of small phase errors over many wavelengths of optical path. For example, if the input phase of an optical signal to an optical fiber is held fixed at 0 degrees, the output phase will drift randomly within the entire range 0 to 360 degrees. To overcome this problem, coherent optical systems require active control to maintain phase coherence, even in the simple case of a single laser feeding an optical fiber having an optical splitter to provide two outputs.

This is why conventional fiber optic communications systems rely on intensity modulation and direct detection, which would be an unbearably primitive and poorly-performing option at RF frequencies where coherent systems are much easier to provide. Note also that all of the above-identified effects leading to random phase in optical fibers are also applicable in principle to any electromagnetic waveguide structure. However, practical path lengths in RF systems aren't nearly as long (as multiples of the relevant wavelength) so the cumulative phase perturbations end up being effectively negligible at RF frequencies.

SUMMARY

We have found, most unexpectedly, that the various known disadvantages of direct distribution in coherent optical and RF systems can be avoided at mm-wave frequencies by using dielectric waveguides (DWGs) for passive coherent distribution. The relevant distribution path lengths at mm-wave frequencies are short enough that accumulated phase error as in optical fibers is not a significant problem. Meanwhile, the dielectric waveguides provide low loss and substantial immunity to electrical interference, thereby avoiding the main disadvantages of direct distribution in RF systems.

This approach provides a method that can substantially increase the capacity in wireless communication links and improve the resolution in imaging/radar systems. DWGs with extremely low loss and large bandwidth at mm-waves allow very efficient signal distribution over relatively large baselines.

Applications include but are not limited to: radar, communication, high speed links and interconnects, data centers, data links, computer systems, mobile platforms, servers, imaging, automotive applications, sensors, drones, fifth-generation systems, metropolitan internet access, last mile telecommunications, backhaul applications, and long range applications.

Significant advantages are provided. There are substantial challenges in implementation of large baseline (in the order of tens or thousands of wavelengths) interconnects in mm-wave arrays with large apertures due to the relatively high transmission loss and limited bandwidth (due to Magnitude roll off) of conventional (TEM waveguides and Non-TEM metal waveguides) feeding/distribution networks. A common system architecture to circumvent the loss issue is realization of the large feed networks/baselines at significantly lower frequencies and up/down convert the signals locally at subarrays. This technique, although it circumvents the loss issue, suffers from limited bandwidth and does not provide highly accurate CLK/LO distributions as needed for high resolution imaging and high capacity communication links. This work provides a method based on mm-wave DWGs with extremely low loss and large bandwidth allowing very efficient signal distribution over relatively large baselines. This can substantially increase the capacity in wireless communication links and improve the resolution in imaging/radar systems.

DETAILED DESCRIPTION

Figure 1:
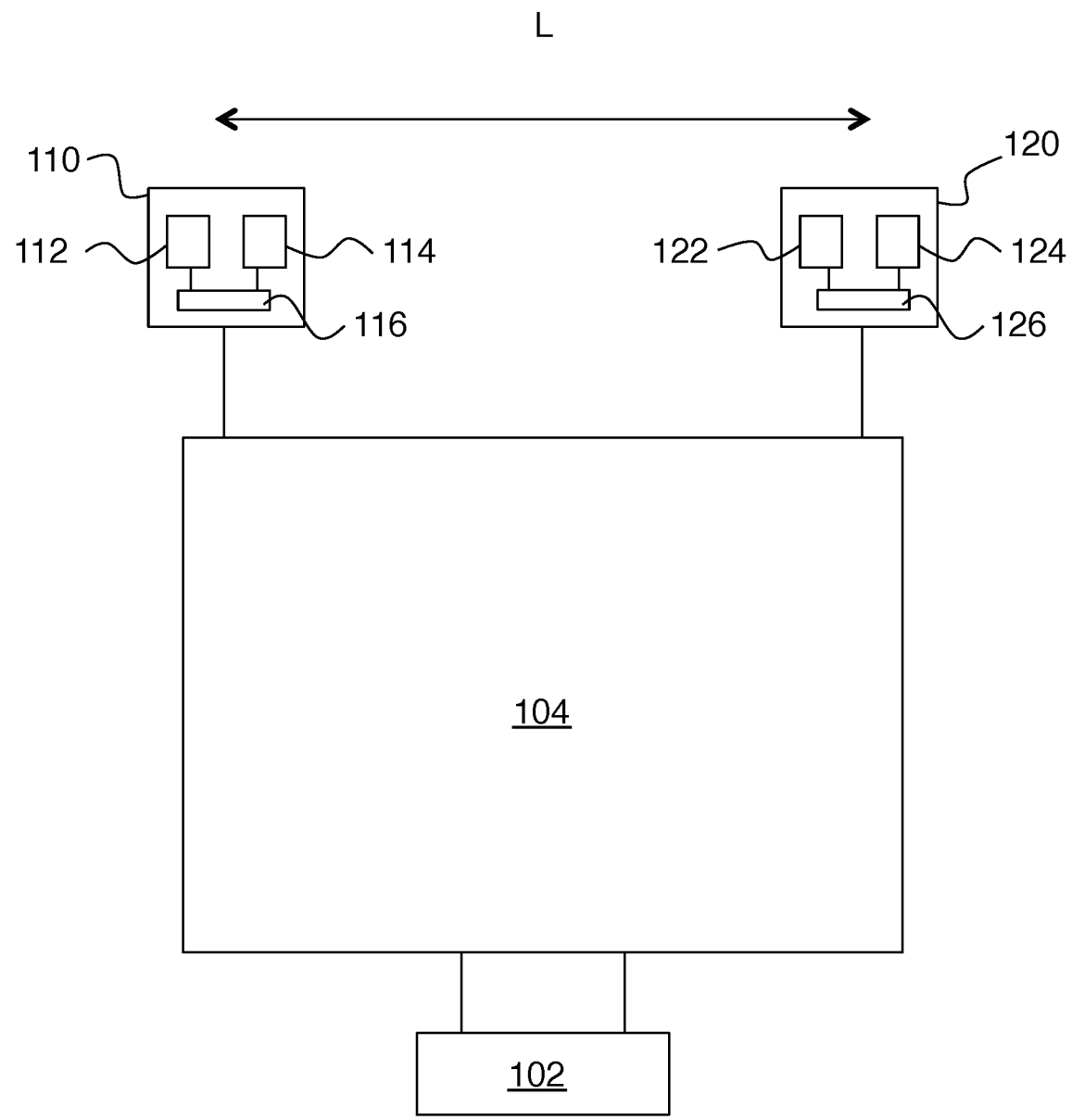
FIG. 1 is a block diagram relating to embodiments of the invention.

FIG. 1 is a block diagram relating to embodiments of the invention. This example is a coherent distributed mm-wave apparatus that includes a central processor 102, a passive distribution network 104 and two or more radiative elements, 110 and 120, having a separation L of 30λ or greater. Here λ is a free space wavelength corresponding to an operating frequency in a range from 20 GHz to 500 GHz, and the operating frequency is taken to be the frequency at which distribution of signals is done in the passive distribution network. Each radiative element includes one or more radiative subelements directly coupled to a front end. Radiative element 110 includes radiative subelements 112 and 114 connected to front end 116. Radiative element 120 includes radiative subelements 122 and 124 connected to front end 126. The spacing between radiative subelements within a radiative element can be any multiple or fraction of the operating wavelength. A radiative element can include any number of radiative subelements, in any arrangement or architecture.

Here a radiative element is defined as one or more radiative subelements directly coupled to a front end. In transmission, the front end drives the radiative subelements, and in reception the radiative subelements drive the front end. "Directly coupled" means that there is no frequency translation by upmixing or downmixing with an intermediate frequency. However, a directly coupled front end can include frequency multiplication or division—e.g., on transmission multiply frequency by 4 and on reception divide frequency by 4—as can be provided by high frequency multiplier circuits.

The passive distribution network 104 connects the central processor to the radiative elements with dielectric waveguides. Signal distribution between the central processor 102 and the radiative elements (110, 120 etc.) using the passive distribution network is direct distribution at the operating frequency. A passive distribution network is defined as an arrangement of waveguides that provides phase coherence between its inputs and output passively (i.e., without active control loops being used to provide phase coherence). As indicated above, this is not possible in some frequency ranges (e.g., in optics).

Here phase coherence is defined as root-mean square (RMS) phase error of 20 degrees or less, more preferably 5 degrees or less, and still more preferably 1 degree or less, all averages being time averages defined over a one minute averaging time. A dielectric waveguide is any electromagnetic waveguide structure that includes only dielectric materials (i.e., no electrical conductors are included). This advantageously ensures that the main distribution connections have no DC electrical path, which helps reduce possible issues from ground loops, electrical interference etc.

In preferred embodiments, the apparatus has beamforming capability by phase shifting the radiative elements with respect to each other with the central processor. Coherent distributions of the signals via passive distribution network 104 is what enables this capability.

As indicated above, direct distribution of mm-wave signals is a key aspect of this work. One example of direct distribution is where a radiated frequency $f_{rad}$ of the radiative elements is substantially the same as a distribution frequency $f_{dist}$ of the passive distribution network. Another example of direct distribution is where the front end includes a frequency multiplier circuit such that a radiated frequency $f_{rad}$ of the radiative elements is related to a distribution frequency $f_{dist}$ of the passive distribution network by $f_{rad}=m*f_{dist}$, where m is an integer greater than one. These two examples of direct signal distribution are in marked contrast to the conventional system architecture where a relatively low frequency baseband signal is frequency translated to a higher RF frequency by mixing with an intermediate frequency signal (IF) in a mixer in a frequency-translating front end.

Practice of the invention does not depend critically on details of the central processing unit. It is preferably a multi-input, multi-output system configured as needed for the intended application. It can include components such as gain stages, mixers to convert to baseband, analog to digital converters, channel separation networks, delay lines, variable gain stages, and complex summing circuits. Note that mixing to convert to baseband in the central processing unit is very different than mixing to baseband in a front end, because in the first case the signal distribution in network 104 is at baseband, and in the second case the signal distribution in network 104 is not at baseband. The central processing unit can be implemented in any combination of analog circuitry, digital circuitry or mixed-mode analog and digital circuitry.

Figure 2:
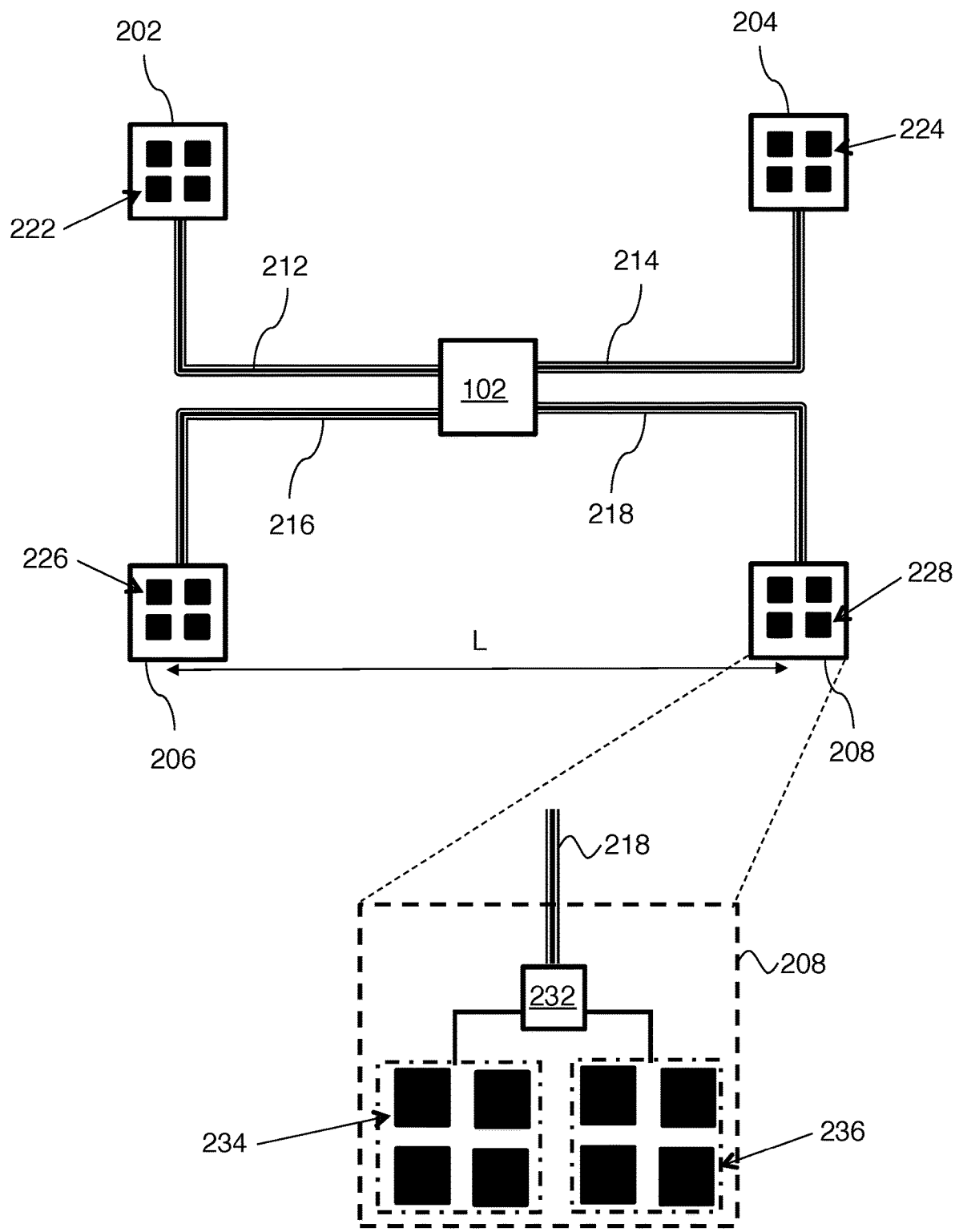
FIG. 2 shows a first exemplary embodiment.

FIG. 2 shows a first exemplary embodiment. In this example, radiative elements 202, 204, 206, 208 are connected to central processing unit 102 via dielectric waveguides 212, 214, 216, 218 respectively. Dielectric waveguides 212, 214, 216, 218 form passive distribution network 104 of FIG. 1 for this example. Radiative elements 202, 204, 206, 208 include radiative subelements schematically referenced 222, 224, 226, 228 respectively. In the enlarged view of radiative element 208, front end 232 is shown connected to two arrays of radiative subelements, 234 and 236.

Figure 3:
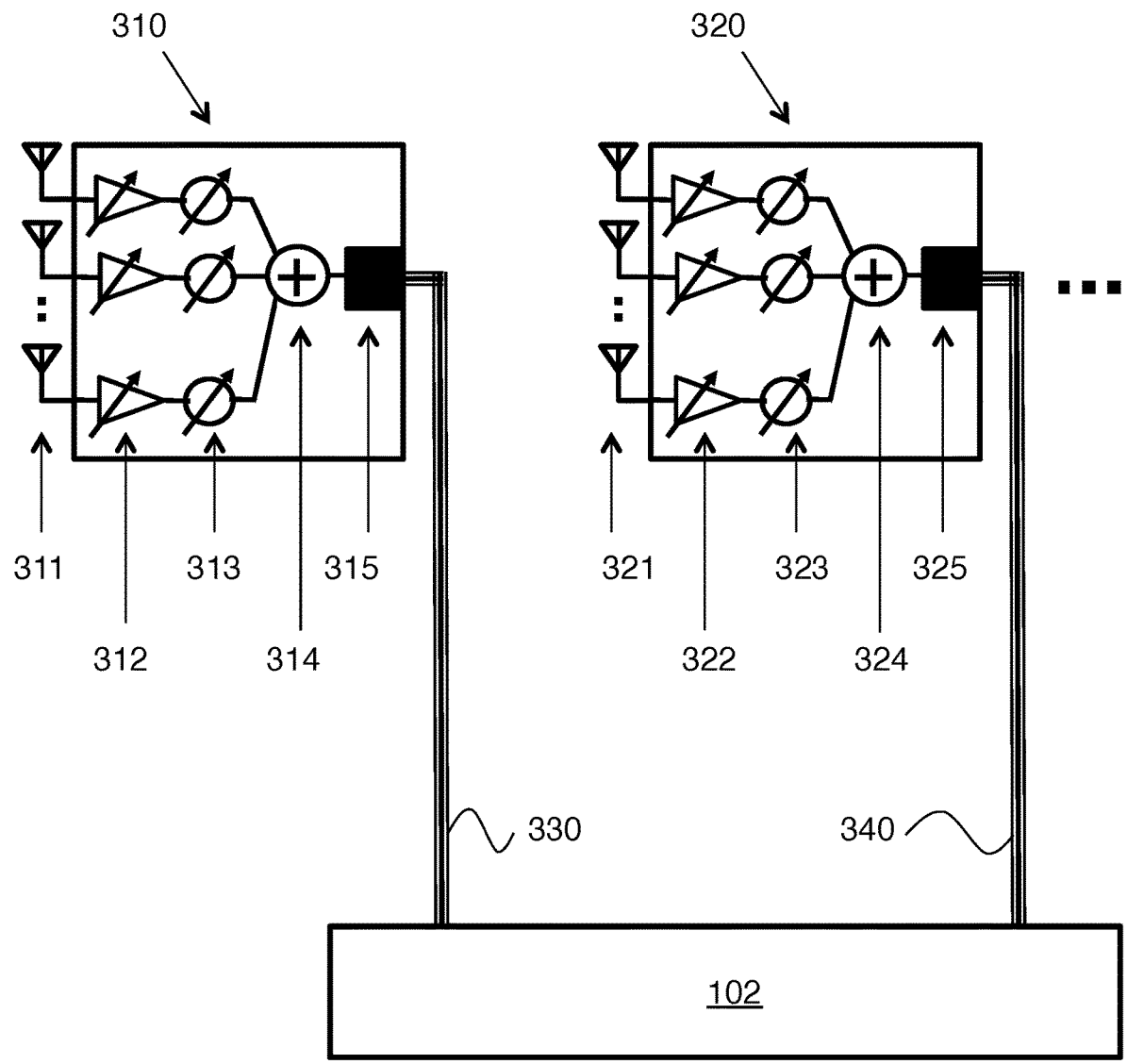
FIGS. 3-4 show two exemplary system architectures for direct mm-wave signal distribution.

FIG. 3 shows an exemplary system architecture for direct mm-wave signal distribution. Here radiative elements 310 and 320 are connected to central processor 102 via dielectric waveguides 330 and 340, and more details of the fronts ends are shown. More specifically radiative element 310 includes radiative subelements 311 and the front end of radiative element 310 includes variable amplifiers 312 and variable phase shifters 313 per subelement connected to a mm-wave combining circuit 314 which is connected to coupler 315 for coupling the front end to dielectric waveguide 330. Similarly, radiative element 320 includes radiative subelements 321 and the front end of radiative element 320 includes variable amplifiers 322 and variable phase shifters 323 per subelement connected to a mm-wave combining circuit 324 which is connected to coupler 325 for coupling the front end to dielectric waveguide 340. In this example, the front ends include a local processor configured to provide individual levels of amplification and/or phase shifts to the subelements of the radiative element. This can be used to provide beamforming by phase shifting the subelements of a radiative element with respect to each other with the local processor.

Figure 4:
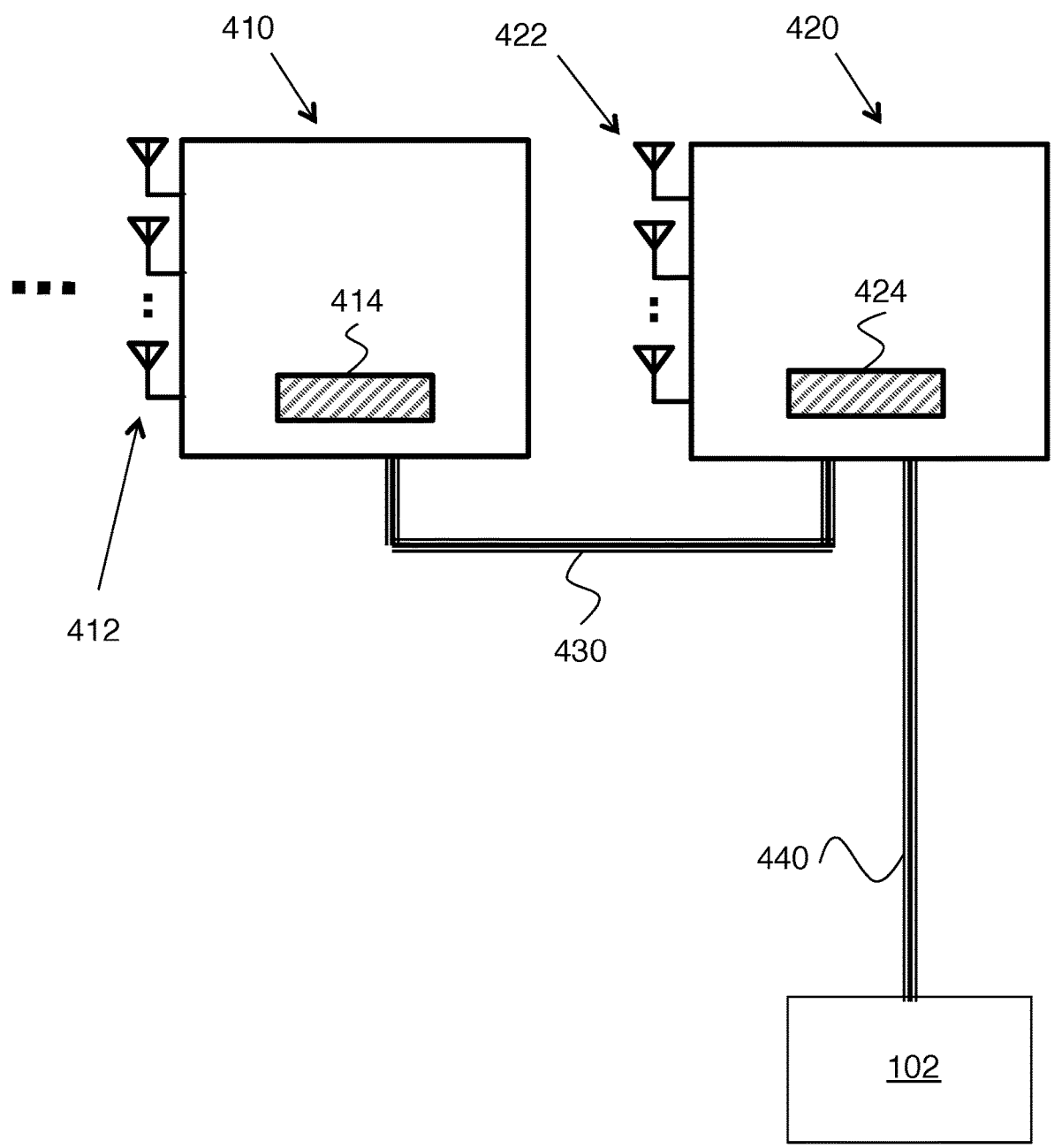

Practice of the invention does not depend critically on the architecture of the passive distribution network. In the examples of FIGS. 2 and 3, this architecture is parallel, where every radiative element has its corresponding dielectric waveguide connection directly to the central processor. FIG. 4 shows an example of a series connected approach, where radiative elements 410, 420 having subelements 412, 422 respectively, and having front ends schematically shown as 414, 424 respectively, are connected to each other in series via dielectric waveguide 430, with one of the radiative elements (420 in this case) being connected to the central processor 102 via dielectric waveguide 440. Any number or arrangement of radiative elements can be employed, as long as they are spaced apart from each other as described above, and they can be connected to the central processor via dielectric waveguides in any configuration, e.g., series, parallel, hybrid series-parallel, hierarchical tree configuration etc.

Figure 5A:
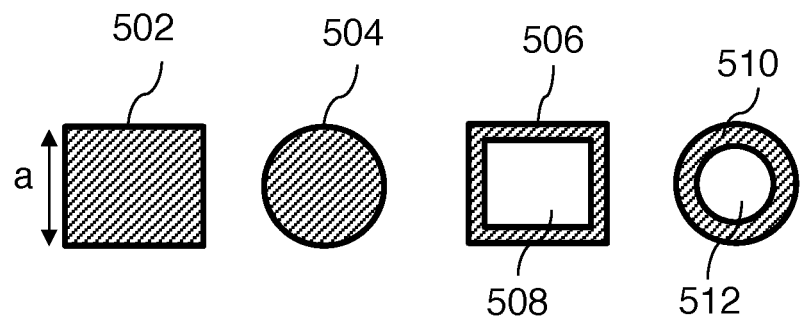
FIG. 5A shows exemplary dielectric waveguide structures.
Figure 5B:
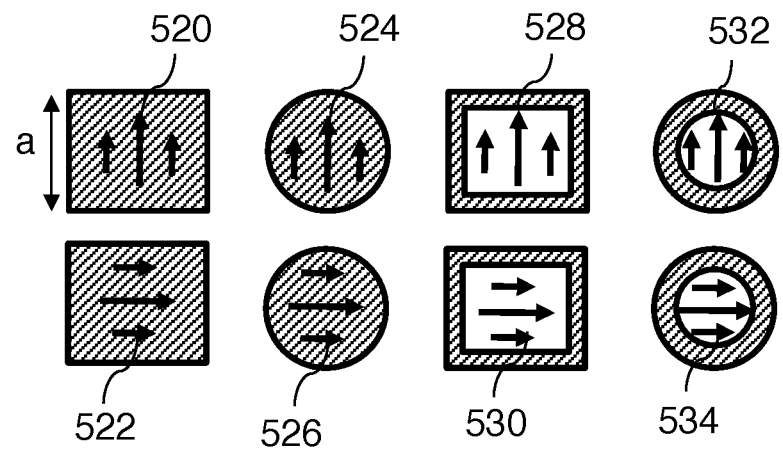
FIG. 5B shows exemplary mode patterns corresponding to the examples of FIG. 5A.

Practice of the invention also does not depend critically on the details of the dielectric waveguides. FIG. 5A shows exemplary DWG shapes, rectangle 502, circle 504, hollow rectangle 506 having air core 508, and hollow circle 510 having air core 512. FIG. 5B shows exemplary mode patterns corresponding to the examples of FIG. 5A. Vertical modes 520, 524, 528, 532 are shown, with corresponding horizontal modes 522, 526, 530, 534. Here the arrows schematically show the electric fields of the modes.

Figure 6A:
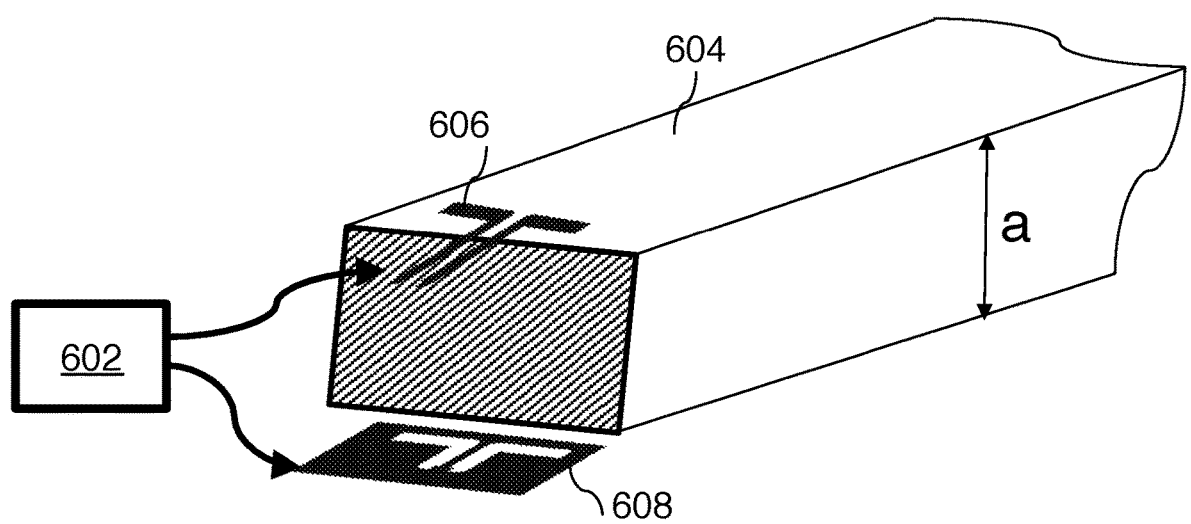
FIGS. 6A-B show an example of multi-mode launch in a dielectric waveguide.
Figure 6B:
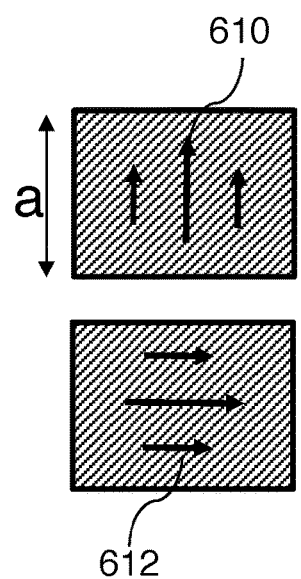

The dielectric waveguides of the passive distribution network can be configured to provide single-mode transmission or multi-mode transmission. FIGS. 6A-B show an example of multi-mode launch in a dielectric waveguide. In this example, a source 602 drives a dipole antenna 606 and a slot dipole antenna 608 that are both coupled to dielectric waveguide 604. The horizontal mode 612 is driven by the dipole antenna 606 and the vertical mode 610 is driven by the slot dipole antenna 608. This can be regarded as providing polarization multiplexed transmission. Higher order modes of the dielectric waveguide can be employed to increase the number of modes used, independently or in addition to the polarization multiplexing of FIGS. 6A-B.

Figure 7A:
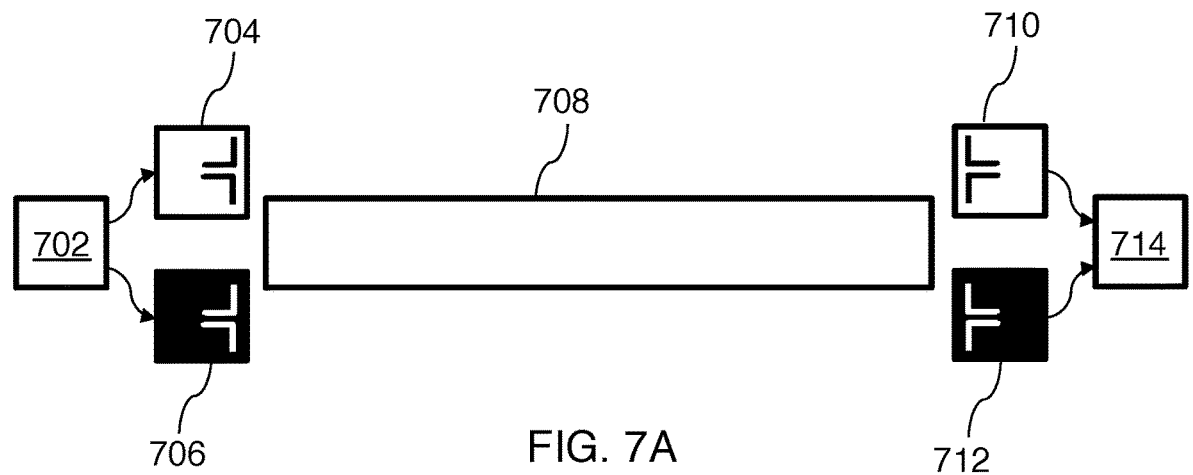
FIGS. 7A-C show further examples relating to multi-mode operation of a dielectric waveguide.
Figure 7B:
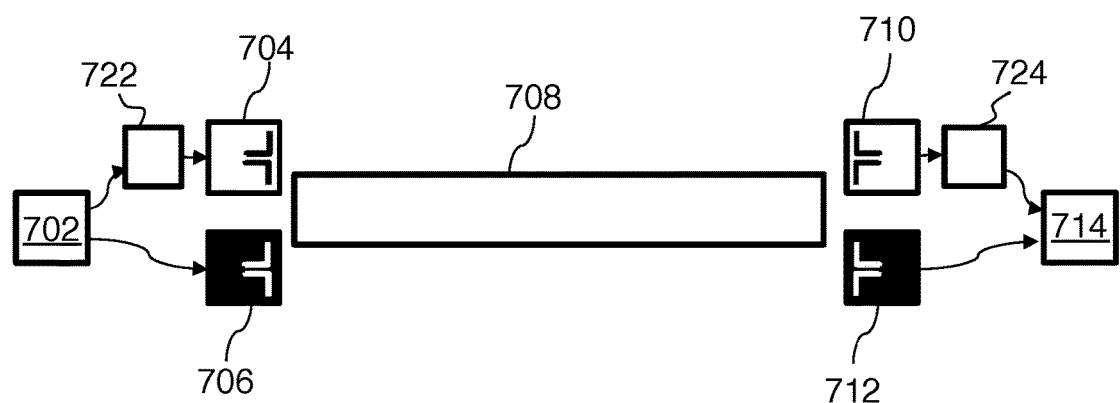
Figure 7C:
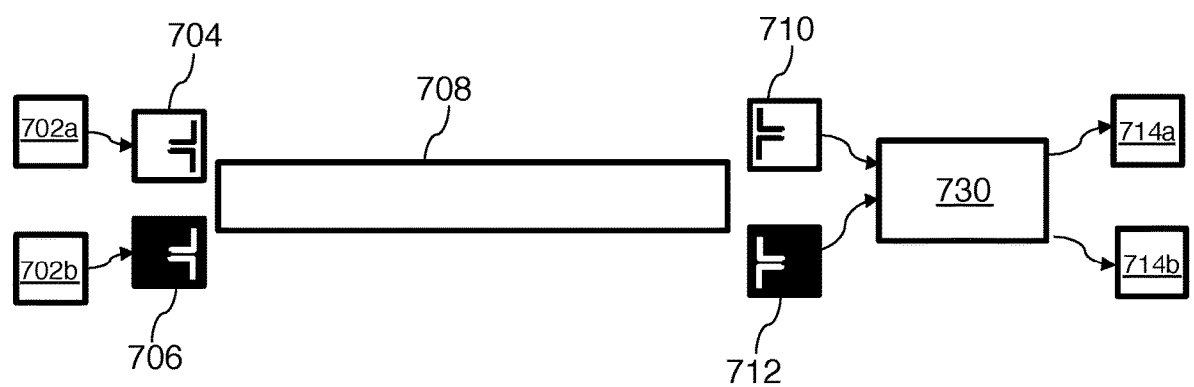

FIGS. 7A-C show further examples relating to multi-mode operation of a dielectric waveguide. FIG. 7A shows a unit 702 connected to antennas 704, 706 coupled to dielectric waveguide 708. At the other end, the structure is similar, with unit 714 connected to antennas 710 and 712 which are coupled to dielectric waveguide 708. One possible use of such a structure is to provide full duplex operation by having transmit and receive be on different modes of the dielectric waveguide. For example, unit 704 could transmit to unit 714 on the waveguide mode coupled to antennas 704 and 710, while unit 714 could transmit to unit 702 on the waveguide mode coupled to antennas 706 and 712. More generally, the dielectric waveguides of the passive distribution network can be configured to provide distribution of transmit signals on a first dielectric waveguide mode and configured to provide distribution of receive signals on a second dielectric waveguide mode distinct from the first dielectric waveguide mode.

The example of FIG. 7B is similar to the example of FIG. 7A, except that 90 degree mm-wave phase shifters 722 and 724 are added to the signal path including antennas 704 and 710. This has the effect of making the two modes in the dielectric waveguide left and right circular polarized modes, as opposed to horizontally and vertically linear polarized modes. This can be used to provide robustness vs. angular misalignment.

The example of FIG. 7C is similar to the example of FIG. 7A, except that unit 702 is now transmitters 702a, 702b, unit 714 is now receivers 714a, 714b, and post processor 730 is inserted to recover the two signals transmitted on two orthogonally polarized modes separately.

Figure 8:
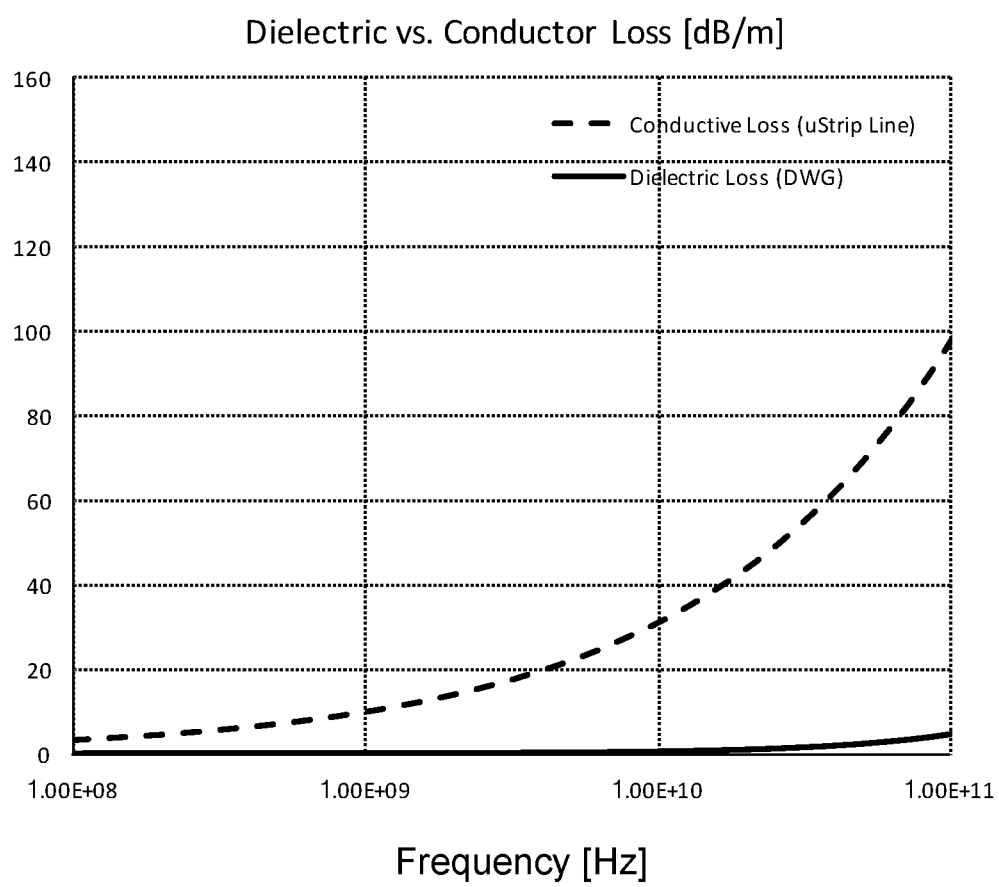
FIG. 8 is a plot comparing loss in a dielectric waveguide vs. loss in a microstrip line.

FIG. 8 is a plot comparing loss in a dielectric waveguide vs. loss in a microstrip line. Here the microstrip loss is conductor losses in copper traces (1 oz Cu, 200 um Wide) and the DWG loss is dielectric loss in HDPE (high density polyethylene) material, assuming 80% field confinement. Comparable performance can also be obtained with bandpass dielectric waveguides appropriately designed for their center frequency and bandwidth.

The invention claimed is:

1. A coherent distributed mm-wave apparatus comprising:
   two or more radiative elements having a separation of $30\lambda$ or greater, wherein $\lambda$ is a free space wavelength corresponding to an operating frequency in a range from 20 GHz to 500 GHz, and wherein each radiative element includes one or more radiative subelements directly coupled to a front end;
   a central processor;
   a passive distribution network connecting the central processor to the two or more radiative elements, wherein the passive distribution network connects the central processor to the radiative elements with dielectric waveguides;
   wherein signal distribution between the central processor and the radiative elements using the passive distribution network is direct distribution at the operating frequency.

2. The apparatus of claim 1, wherein the apparatus has beamforming capability by phase shifting the radiative elements with respect to each other with the central processor.

3. The apparatus of claim 1, wherein the front end of at least one of the radiative elements includes a local processor configured to provide individual levels of amplification and/or phase shifts to the subelements of the radiative element.

4. The apparatus of claim 3, wherein the least one of the radiative elements has beamforming capability by phase shifting its subelements with respect to each other with the local processor.

5. The apparatus of claim 3, wherein the local processor includes a frequency multiplier circuit such that a radiated frequency $f_{rad}$ of the radiative elements is related to a distribution frequency $f_{dist}$ of the passive distribution network by $f_{rad}=m*f_{dist}$, wherein m is an integer greater than one.

6. The apparatus of claim 1, wherein a radiated frequency $f_{rad}$ of the radiative elements is substantially the same as a distribution frequency $f_{dist}$ of the passive distribution network.

7. The apparatus of claim 1, wherein the passive distribution network passively provides a phase error of 20 degrees or less in the frequency range from 20 GHz to 500 GHz between the radiative elements and the central processing unit, wherein the phase error is a root-mean-square time average computed in a one minute averaging window.

8. The apparatus of claim 1, wherein the dielectric waveguides of the passive distribution network are configured to provide single-mode transmission.

9. The apparatus of claim 1, wherein the dielectric waveguides of the passive distribution network are configured to provide multi-mode transmission.

10. The apparatus of claim 1, wherein the dielectric waveguides of the passive distribution network are configured to provide polarization multiplexed transmission.

11. The apparatus of claim 1, wherein the dielectric waveguides of the passive distribution network are configured to provide distribution of transmit signals on a first dielectric waveguide mode and configured to provide distribution of receive signals on a second dielectric waveguide mode distinct from the first dielectric waveguide mode.

12. The apparatus of claim 1, wherein a cross section of the dielectric waveguides is selected from the group consisting of: rectangular, circular, hollow rectangular, and hollow circular.

13. The apparatus of claim 1, wherein the central processing unit is a multi-input, multi-output system including any combination of one or more components selected from the group consisting of: gain stages, mixers to convert to baseband, analog to digital converters, channel separation networks, delay lines, variable gain stages, and complex summing circuits.

14. The apparatus of claim 1, wherein the central processing unit is implemented in any combination of analog circuitry, digital circuitry or mixed-mode analog and digital circuitry.

15. The apparatus of claim 1 configured for an application selected from the group consisting of: radar, communication, high speed links and interconnects, data centers, data links, computer systems, mobile platforms, servers, imaging, automotive applications, sensors, drones, fifth-generation systems, metropolitan internet access, last mile telecommunications, backhaul applications, and long range applications.

\* \* \* \* \*